US006224126B1

(12) United States Patent
Martin et al.

(10) Patent No.: US 6,224,126 B1
(45) Date of Patent: May 1, 2001

(54) SLIDE-OUT AND LOCKING MECHANISM

(75) Inventors: Larry Allan Martin, Goshen; David Erwin Carpenter, Bremen; Michael Charles Hyndman, Nappanee, all of IN (US)

(73) Assignee: Thor Tech, Inc., Las Vegas, NV (US)

( * ) Notice: Subject to any disclaimer, the term of this patent is extended or adjusted under 35 U.S.C. 154(b) by 0 days.

(21) Appl. No.: 09/514,682

(22) Filed: Feb. 28, 2000

Related U.S. Application Data
(60) Provisional application No. 60/122,305, filed on Mar. 1, 1999.

(51) Int. Cl.[7] ................. B60P 3/32; B60P 3/35; B60P 3/34; B60P 3/377
(52) U.S. Cl. .......... 296/26.01; 296/171; 296/175; 296/165; 296/26.03; 296/26.12; 52/67
(58) Field of Search ............ 296/26.01, 26.03, 296/26.09, 26.12, 26.13, 165, 171, 175, 176; 52/67

(56) References Cited

U.S. PATENT DOCUMENTS

| 5,491,933 | * | 2/1996 | Miller et al. ............... 52/67 |
| 5,620,224 | | 4/1997 | DiBiagio et al. . |
| 5,658,032 | * | 8/1997 | Gardner .................. 296/26 |
| 5,785,373 | * | 7/1998 | Futrell et al. ............. 296/26.01 |
| 5,894,698 | * | 4/1999 | Dewald, Jr. et al. ............ 52/67 |
| 6,007,142 | * | 12/1999 | Gehman et al. ............ 296/171 |
| 6,017,080 | * | 1/2000 | Gill ...................... 296/173 |
| 6,094,870 | * | 8/2000 | Stacy ...................... 52/67 |

FOREIGN PATENT DOCUMENTS

925908 * 5/1973 (CA) ................. 296/26.01

* cited by examiner

Primary Examiner—D. Glenn Dayoan
Assistant Examiner—Greg Blankenship
(74) Attorney, Agent, or Firm—Killworth, Gottman, Hagan & Schaeff, L.L.P.

(57) ABSTRACT

A recreational vehicle including a "slide-out" cabin portion is equipped with a locking mechanism which comprises a lock door pivotally rotatable to interfere with the wall opening periphery through which the slide-out cabin portion transitions. The slide-out further has an extensible portion front end positioned external to the wall opening such that the dimensions of the extensible portion front end exceed the dimensions of the wall opening. The extensible portion front end contacts the main cabin wall opening periphery along the entire perimeter of the wall opening thus completely sealing the wall opening when the slide-out is in a fully retracted position. Further, the slide-out locks are positioned sufficiently close to the extensible portion front end that when the slide-out is in a retracted position and the slide-out locks are in the locked position, the main cabin wall periphery is pinched between the slide-out locks and the extensible portion front end.

22 Claims, 3 Drawing Sheets

SLIDE-OUT AND LOCKING MECHANISM

CROSS REFERENCE TO RELATED APPLICATIONS

This application claims the benefit of U.S. Provisional Application No. 60/122,305, Filed Mar. 1, 1999, which is incorporated herein by reference.

BACKGROUND OF THE INVENTION

The present invention relates to trailers including travel trailers, motor homes, recreational vehicles, and fifth wheel trailers and, more particularly to such trailers provided with extensible cabin portions.

Many trailers provide cabin portions commonly referred to as "slide-outs" which extend the interior cabin volume while the trailer is parked. This design allows the trailer to maintain a minimal size while in transit, and expand to allow for extended interior volume while parked. The slide-out cabin portion is typically supported so as to slide along the floor of the main room for movement between a retracted position and an extended position. The present inventors have recognized a need to secure the slide-out in a retracted position such that the slidable mechanism is locked and incapable of advancing the extensible portion toward its extended position.

Further, The present inventors have recognized a need to provide a mechanism that minimizes vibration to reduce risk of damage to the slide-out or other components of the trailer and to pull the top portion of the slide-out tight against the main cabin to prevent leaks between the main cabin wall opening and the slide-out.

BRIEF SUMMARY OF THE INVENTION

The present invention is directed to trailers including travel trailers, motor homes, recreational vehicles, and fifth wheel trailers provided with slide-out cabin portions and an automated locking mechanism arranged to secure the slide-out cabin portion in a retracted position.

In accordance with one embodiment of the present invention, a vehicle includes a main cabin wall with a wall opening extending therethrough. A slide-out cabin comprising an extensible portion is laterally movable through the main cabin wall opening from a retracted position substantially interior to the wall opening, to an extended position substantially exterior to the wall opening. A slide-out lock is included to secure the extensible cabin portion of the slide-out in the retracted position. The slide-out lock comprises a lock door pivotally rotatable from an unlocked position dissociated with the wall opening periphery to a locked position engaged with the wall opening periphery.

Preferably, the slide-out lock utilizes a motor which connects to a drive shaft. A drive catch is engaged with the drive shaft such that the rotational motion of the motor translates to linear motion of the drive catch along the drive shaft. An arm linkage couples the lock door to the drive catch. The lock door is hinged to a lock door housing which comprises a frame around the lock door. The door hinge axis traverses the frame and is positioned adjacent a frame edge so that the linear movement of the drive catch translates to rotational motion of the door which is pivotally rotatable about the door axis.

The slide-out may include multiple locks arranged to lock the slide-out extensible portion of the slide-out. An optional controller programmed to prevent the slide-out locks from transitioning to the locked position unless all slide-out locks are in the unlocked position may thus be implemented. Preferably, this is accomplished by a limit switch arranged to be engaged by the drive catch. When the drive catch is positioned such that the lock door is closed, the drive catch contacts the limit switch closing the limit switch contact. As the drive catch transitions away from the limit switch towards a door open position, the limit switch contact is opened.

The slide-out may include an extensible portion front end positioned external to the main cabin wall opening where the extensible portion front dimensions exceed the dimensions of the main cabin wall opening. The wall opening through which the extensible slide-out cabin portion is movable is preferably provided with a wall opening seal.

The slide-out further comprises a first extensible portion side wall and a second extensible portion side wall. The slide-out lock further comprises a first slide-out lock positioned along the surface of the first extensible portion side wall and a second slide-out lock positioned along the surface of the second extensible portion side wall. The first and second slide-out locks are arranged such that when the first and second slide-out locks are in the locked position and the extensible portion is in the retracted position, the lock doors engage the wall opening periphery. Optionally, the extensible portion of the slide-out further comprises an extensible portion front end positioned external to the wall opening and arranged such that when the extensible portion is in the retracted position, the extensible portion front end contacts the external wall periphery, thus the wall periphery is pinched between the slide-out locks inside the main cabin, and the extensible portion front end outside the main cabin. The slide-out locks are positioned along the extensible portion side walls such that the first slide-out lock is positioned vertically near the top portion of the first extensible side wall, and the second slide-out lock is positioned vertically near the top portion of the second extensible side wall. A wall opening seal may additionally be provided such that the wall opening is completely sealed when the extensible portion is in the retracted position and the first and second slide-out locks are in the locked position.

In accordance with another embodiment of the present invention, a vehicle includes a main cabin wall including a wall opening extending therethrough. A slide-out cabin comprising an extensible portion is laterally movable through the wall opening from a retracted position substantially interior to the wall opening, to an extended position substantially exterior to the wall opening. The extensible portion includes a first extensible portion side wall and a slide-out locking mechanism. The slide-out locking mechanism comprises a first slide-out lock arranged to secure the extensible cabin portion in the retracted position. The first slide-out lock comprises a lock door pivotally rotatable from an unlocked position proximate the first extensible portion side wall, to a locked position substantially displaced from the first extensible portion side wall.

The extensible portion may comprise a second extensible portion side wall. A second slide-out lock would then be included in the locking mechanism arranged to secure the extensible cabin portion in the retracted position. The second slide-out lock comprises a second slide-out lock door pivotally rotatable from an unlocked position substantially proximate the second extensible portion side wall, to a locked position substantially displaced from the second extensible portion side wall. The first and second slide-out locks are positioned along the surface of the extensible portion side walls such than when the extensible portion is in the retracted position and the slide-out locks are in the locked position, the lock doors engage the wall opening periphery. The first slide-out lock is positioned vertically near the top portion of the first extensible side wall, and the second slide-out lock is positioned vertically near the top portion of the second extensible side wall. A controller programmed to prevent the slide-out locks from transitioning to the locked position unless all slide-out locks are in the unlocked position may be included.

Preferably, the extensible portion further comprises an extensible portion front end positioned external to the wall opening and arranged such that when the extensible portion is in the retracted position, the extensible portion front end contacts the external wall periphery. A wall opening seal may be provided such that the wall opening is completely sealed when the extensible portion is in the retracted position and the slide-out locking mechanism is in the locked position.

In accordance with yet another embodiment of the present invention, a vehicle comprises a main cabin wall, a wall opening extending therethrough, and a wall opening periphery. A slide-out cabin comprising an extensible portion is laterally movable through the wall opening from a retracted position substantially interior to the wall opening, to an extended position substantially exterior to the wall opening, and a slide-out lock is arranged to secure the extensible cabin portion in the retracted position. The slide-out lock comprises a lock door adjustable from a locked position interfering with the lateral movement of the extensible portion to an unlocked position unbiased with respect to lateral movement of the extensible portion.

It is an object of the invention to provide a slide-out lock that tightly secures an extensible cabin portion of a slide-out in a fully retracted position, thus reducing vibration of the slide-out while in the locked position and while the vehicle is in motion.

It is an object of the present invention to provide a slide-out lock controller programmed to prevent the locking of the slide-out in a retracted position unless all sensors indicate that the slide-out is unlocked.

These and other objects and features of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the drawings, where like structures are indicated with like reference numerals and in which.

DETAILED DESCRIPTION OF THE PREFERRED EMBODIMENTS

Figure 1:
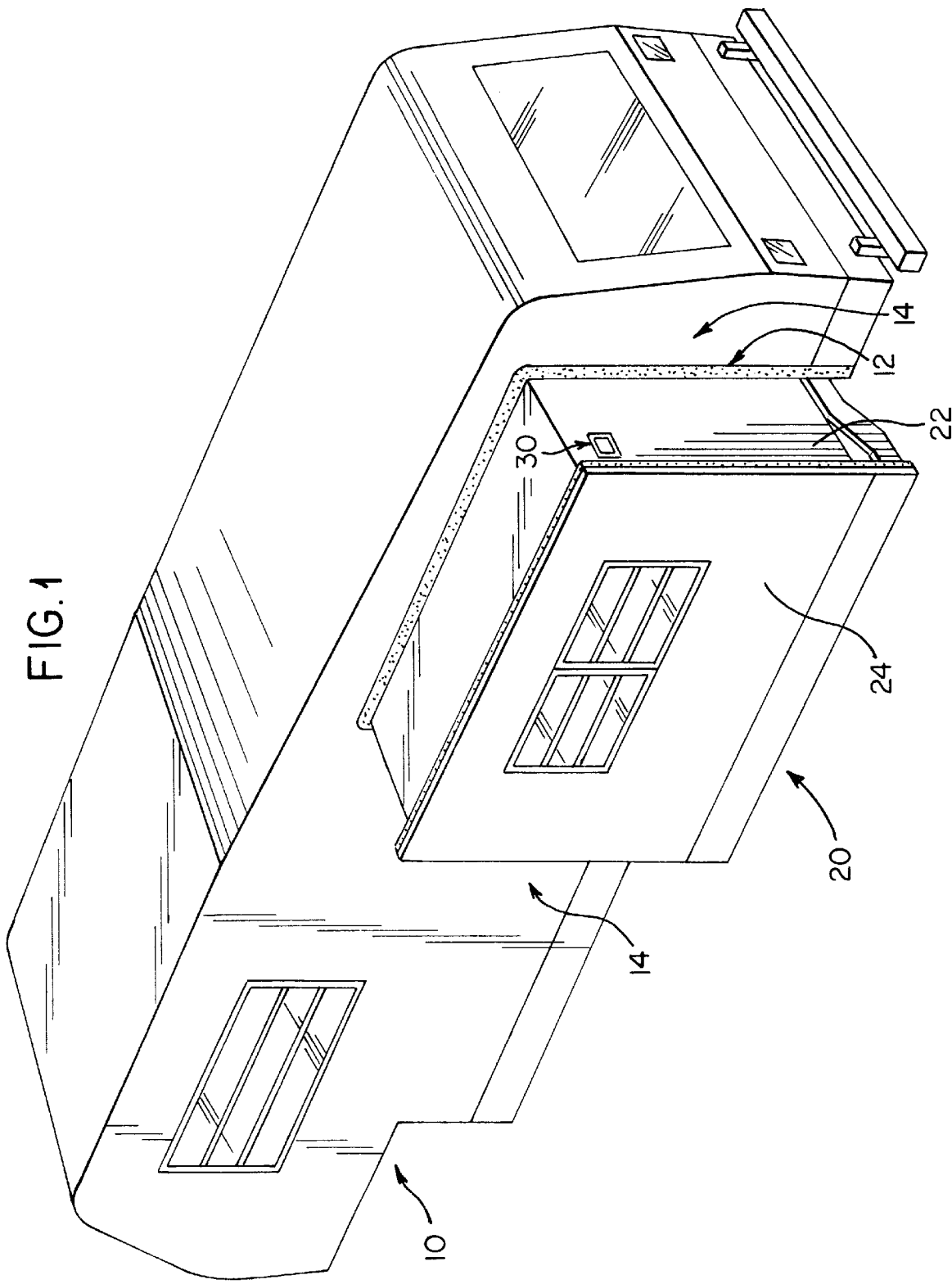
FIG. 1 is an illustration of a camper including a slide-out in an extended position.

Referring initially to FIG. 1, a typical camper main cabin 10 including a slide-out 20 in the extended position is illustrated. The slide-out 20 moves laterally through the main cabin wall opening 12. The main cabin wall opening 12 includes a seal between the main cabin wall opening periphery 14 and the slide out 20.

Figure 2:
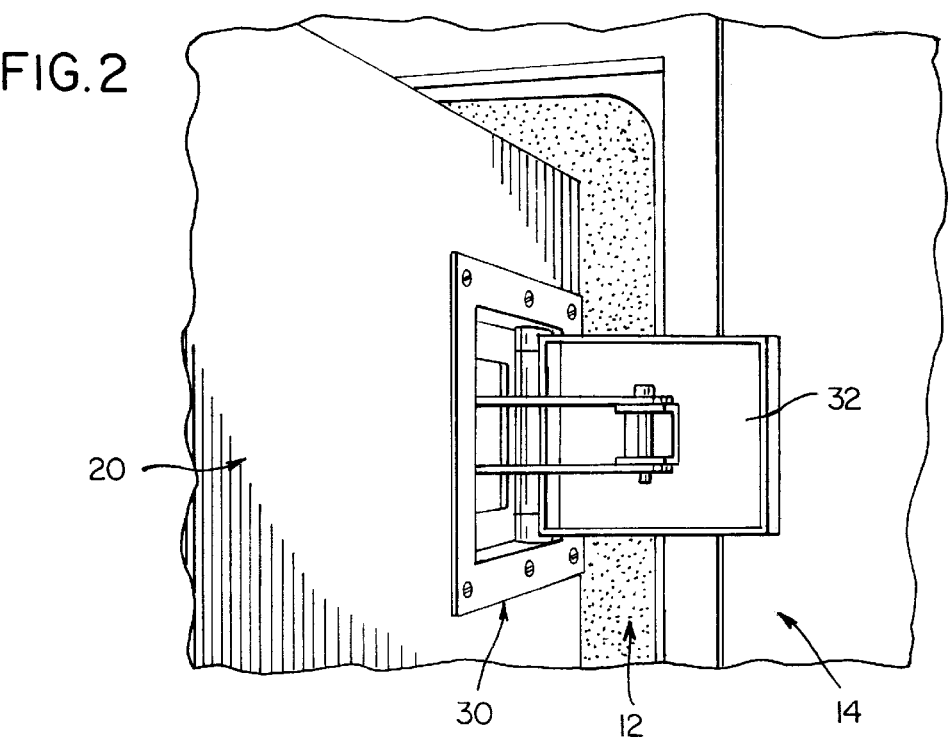
FIG. 2 is an illustration of the slide-out lock in the locked position according to the present invention.

Referring to FIG. 2, the arrangement of a slide-out lock 30 according to the present invention is illustrated in the locked position. Generally speaking, the slide-out lock 30 is activated to secure the slide-out cabin 20 in the retracted position by rotating lock door 32 to interfere with the main cabin wall periphery 14 adjacent to the wall opening 12, thus restricting lateral movement of slide-out 20 through the wall opening 12.

Figure 3:
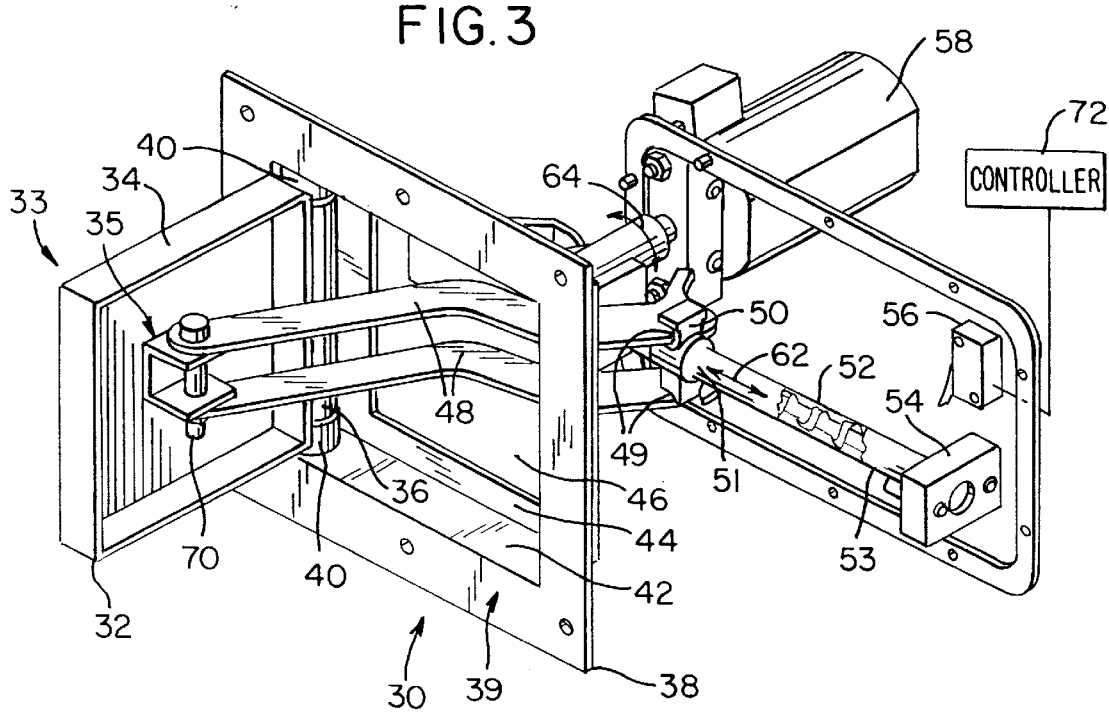
FIG. 3 is an illustration of an isometric of the slide-out lock with the housing removed according to the present invention.
Figure 4:
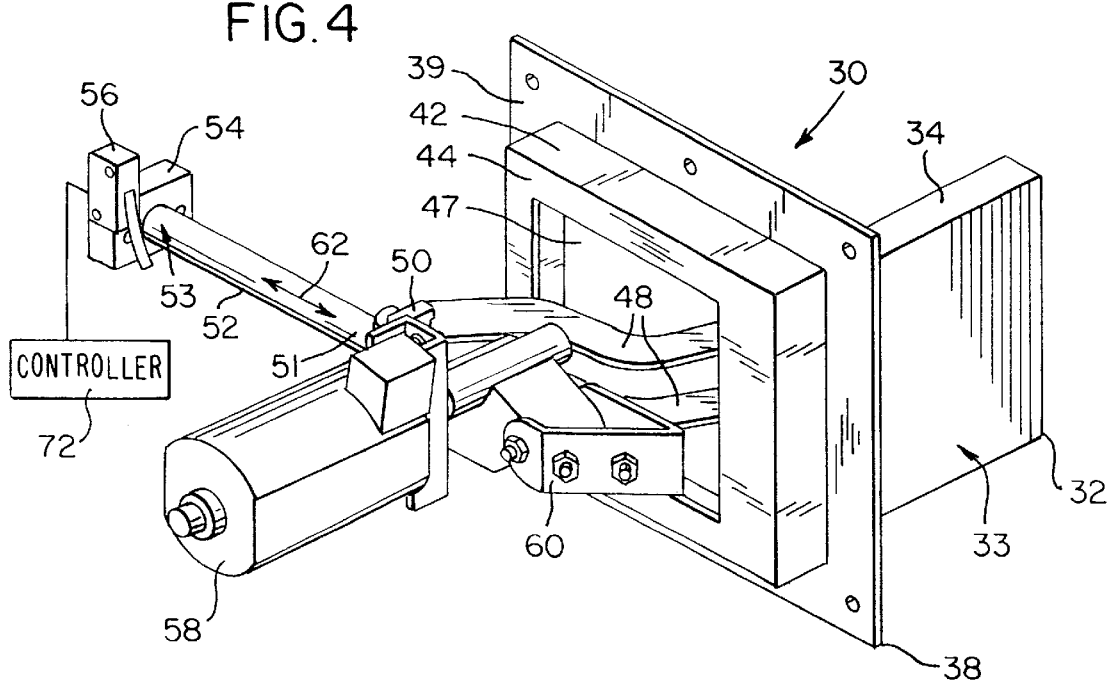
FIG. 4 is an illustration of an isometric back view of the slide-out lock with the housing removed of FIG. 2.

Referring to FIGS. 3 and 4, the operation of a slide-out lock 30 according to the present invention is described. The illustrated slide-out lock 30 includes a lock door 32, a lock housing 38, an arm linkage 48, a drive shaft 52, a drive catch 50, a motor 58, and a limit switch 56.

The slide-out lock 30 operates to open and close lock door 32 by coupling the rotational motion of the motor 58 to the lock door 32 via the drive shaft 52 and arm linkage 48. Specifically, the rotational motion of the motor 58 illustrated by directional arrow 64 causes linear motion of the drive catch 50 provided on the drive shaft 52 illustrated by the directional arrow 62. The arm linkage 48 engages the drive catch 50 at one end and is coupled to the lock door 32 by pin 70 at its opposite end. Lock door 32 is arranged to pivot about the door axis, or door hinge 40 as the arm linkage 48 moves back and forth with the drive catch 50.

The slide-out lock 30 is designed such that when the drive shaft 52 linearly transitions the drive catch 50 to its first end 51, the lock door 32 is open. The first end 51 of drive shaft 52 is proximate to the lock door hinge 40. It should also be pointed out that the amount that the lock door 32 opens should be adjusted such that when the lock door 32 is installed, preferably on the slide-out extensible portion side wall, and in the full open position, the lock door 32 is substantially parallel to the main cabin wall periphery 14. When the drive shaft 52 linearly transitions the drive catch 50 to its second end 53, the lock door 32 is closed. The second end 53 of drive shaft 52 is distal to lock door hinge 40. The second end 53 of drive shaft 52 should be adjusted such that when the lock door 32 is installed, preferably on the slide-out extensible portion side wall, and in the fully closed position, the lock door 32 is substantially perpendicular to the main cabin wall periphery 14.

It should be pointed out that the lock door 32 can be hinged to the lock housing 38 using any suitable means. One acceptable method is to form lock door 32 from a substantially rectangular lock door plate 33 reinforced by support flanges 34. Preferably, the lock door plate 33 is about 4 inches by 4 inches, the support flanges 34 are about ¾ inches wide, and the support flange seams are joined solid and sealed, thus forming the shape of a lid. The lock housing 38 further has a face plate 39 surrounding the lock door 32. The face plate 39 defines a first rectangular opening 46 slightly larger in dimension than that of lock door 32 and through which lock door 32 can rotate. Referring to FIG. 4, flanges 42 extend perpendicular to the face plate 39, and recess back into the lock housing 38 a depth slightly greater that the support flange 34 width of lock door 32. Lastly, the flanges 44 of the lock housing face plate 39 bend inward forming a second rectangular opening 47 substantially parallel to the face plate 39, and where the second rectangular opening 47 dimensions are slightly smaller than that of lock door 32. Again, the lock housing face plate 39 flange seams are preferably joined solid and sealed. Preferably, the support flange 34 edges of lock door 32 can rest upon the flanges 44 forming the second rectangular opening 47 periphery of the face plate 39 such that lock door plate 33 is substantially coplanar with the surface of face plate 39.

Referring now to FIG. 3, the hinging mechanism is described. A round hinge tube 36 with a bore extending therethrough is secured to the surface of one of the lock door support flanges 34. The axis extending through the bore in hinge tube 36 should be substantially parallel to the edge of lock door plate 33 adjacent to the flange 34 securing the hinge tube 36. An acceptable example of a hinge tube 36 would have a ¾ inch outside diameter, a ½ inch inside diameter, a 3-½ inch length, and would be centered on, and secured to the flange 34 with a solid weld on both sides of the point of contact of hinge tube 36 to flange 34.

The lock door hinge 40 is formed from two short pieces of frame hinge tubing 40 secured to the perpendicular flange 42 of the face plate 39. The length of each frame hinge tube 40 is chosen such that when one frame hinge tube 40 is placed on either side of the hinge tube 36, the total length of tubing is substantially the length of the first rectangular opening 46 of face plate 39. The frame hinge tubes 40 are secured to the flanges 42 of face plate 39 that recess into the lock housing 38. They are positioned sufficiently near an edge such that when lock door 32 is hinged about lock door hinges 40, the lock door 32 is freely rotatable about lock door hinge 40 for the desired range of motion. A compression spring (not shown) is inserted into hinge tube 36, then a pin, (not shown) is placed into each end of the hinge tube 36. The compression spring is compressed, then the pins are slipped into the frame hinge tubing 40 thus hinging lock door 32 to the face plate 39. A suitable compression spring would have approximately a 3-¾ inch length, and an outside diameter just less than the inside diameter of hinge tube 36. Suitable pins would have the same diameter as the inside diameter of the hinge tube 36, and be approximately 1 inch in length each. Finally, the lock door 32 is hinged to lock housing 38 through hinge tube 36 such that when the lock door 32 is closed, it is substantially coplanar with the face 39 of lock housing 38.

The drive shaft 52 can be accomplished by any suitable means. A suitable drive shaft 52 would be a screw drive. The drive catch 50 is provided with two rigid brackets 49, one on opposite sides of drive catch 50. Each bracket 49 receives one arm linkage 48. The pair of arm linkages 48 move concurrently in cooperation with drive catch 50. Suitable means are provided for securing the arm linkages 48 to lock door 32 by arm hinge 35. The arm hinge 35 comprises a U-shaped member permanently secured to the rear face of lock door plate 33. The arm hinge 35 is designed such that when the pair of arm linkages 48 are secured to the arm hinge 35, they remain parallel to each other. Pin 70 is an example of a suitable means to secure the pair of arms 48 to lock door 32.

Figure 5:
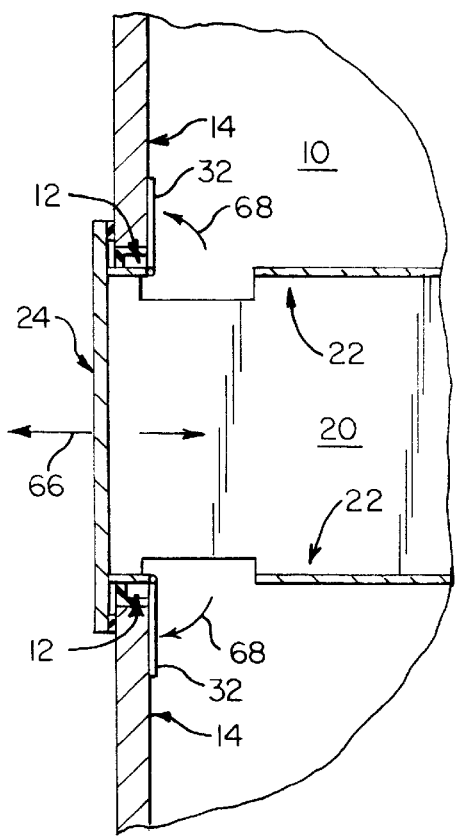
FIG. 5 is an illustration of a cross sectional view of the slide-out lock in the locked position according to the present invention.
Figure 6:
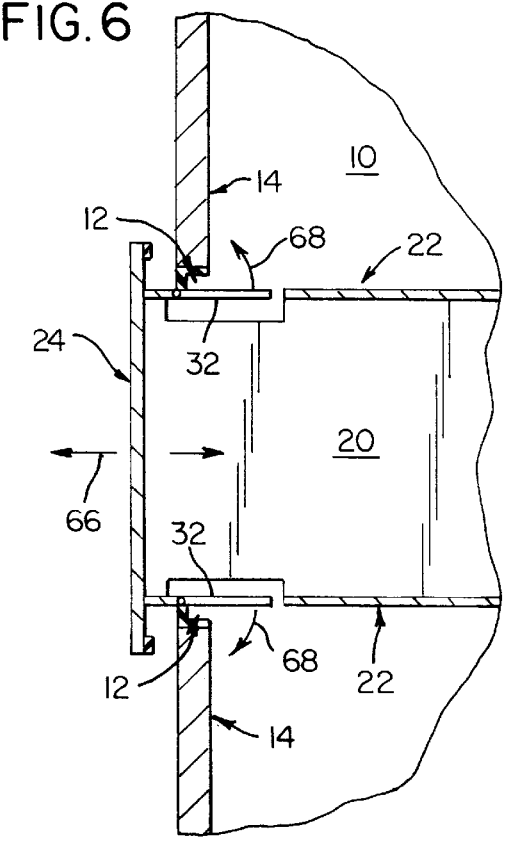
FIG. 6 is an illustration of a cross sectional view of the slide-out lock in the unlocked position according to the present invention.

FIG. 5 and FIG. 6 further illustrate the present invention. One slide-out lock 30 is placed on each side wall 22 of slide-out 20 positioned near the front of the slide-out 20 such that when the slide-out locks 30 are in a locked position, the slide out 20 is substantially inside the main cabin 10. The slide-out locks 30 are configured to open lock doors 32 in the direction illustrated by directional arrow 68. The slide-out cabin 20 is laterally moveable through wall opening 12 illustrated by directional arrows 66. FIG. 5 illustrates the slide-out lock doors 32 in the locked position, while FIG. 6 illustrates the slide-out lock doors 32 in the unlocked or unbiased position. When the slide-out locks 30 are in the unbiased position, the slide-out cabin 20 is movable laterally through main cabin wall opening 12 without concern over slide-out lock interference. As is illustrated in FIGS. 5–6, when the lock doors 32 are opened, the slide-out cabin 20 may be locked in the retracted position. As FIG. 5 illustrates, the lock doors 32 interfere with the main cabin wall periphery 14 and resist any lateral movement outward of slide-out 20. When the lock doors 32 are closed, the slide-out cabin 20 is unlocked and may be extended and retracted laterally through wall opening 12 of main cabin 10 in the direction of directional arrows 66. "Interior" refers to the interior of the vehicle main cabin 10 while "exterior" refers to the exterior of the vehicle main cabin 10. The extensible portion of the slide-out 20 has two side walls 22 which are oriented so as to be substantially perpendicular to the main cabin wall opening periphery 14. Thus, the slide-out lock 30 is designed such that when the drive shaft 52 linearly transitions the drive catch 50 to its first end 51, the lock door 32 is open substantially parallel to the main cabin wall periphery 14, and substantially perpendicular to slide-out side wall 22. Likewise, when the drive shaft 52 linearly transitions the drive catch 50 to its second end 53, the lock door 32 is in its closed or unbiased position substantially perpendicular to the main cabin wall periphery 14, and parallel to the slide-out side wall 22.

Both slide-out locks 30 are automatically controlled by a common wiring scheme thus forming a slide-out locking mechanism. Referring to FIGS. 3–4, the limit switch 56 is provided to ensure that the mechanism provided for extension and retraction of the slide-out cabin cannot be powered-up unless both of the lock doors 32 are concomitantly in the closed position. Specifically, a limit switch 56 is provided in both slide-out locks 30. As the slide-out door 32 transitions from an open position to a closed position, the rotation of motor 58 causes linear motion in drive shaft 52 which results in drive catch 50 linearly transitioning along drive shaft 52 towards its second end position 53. The drive catch 50 has a substantially planer surface designed to engage the blade of limit switch 56 when drive catch 50 is near its second end position. In operation, when drive catch 50 is distal to limit switch 56, the lock door 32 is in an open position, and the blade of the limit switch 56 is lifted from its contact surface. As drive catch 50 reaches a predetermined position along drive shaft 52, the substantially planer surface of drive catch 50 engages the blade of limit switch 56 such that when lock door 32 is closed, the blade of limit switch 56 is closed against its contact surface.

A controller 72 is formed by a circuit comprising both limit switches 56 and is implemented such that the circuit is electrically open unless both lock doors 32 are closed. When each lock door 32 is closed, both limit switches 56 are closed and the electrical circuit providing power to the slide-out extension and retraction mechanism is operable. If either one of the lock doors 56 is not fully closed, the corresponding limit switch 56 will be open and the circuit for extending or retracting the slide-out cabin 20 will be open or inoperable. A detailed circuit diagram has not been provided with the present description of the invention because one of ordinary skill in the art could readily develop an appropriate circuit in view of the functional description provided herein.

The slide-out 20 further has an extensible portion front end 24 positioned external to the wall opening 12 such that the dimensions of the extensible portion front end 24 exceed the dimensions of the wall opening 12. Preferably, the extensible portion front end 24 will contact the main cabin wall opening periphery 14 along the entire perimeter of wall opening 12 thus completely sealing the wall opening 12 when slide-out 20 is in a fully retracted position. Further, the slide-out locks 30 should be positioned sufficiently close to the extensible portion front end 24 that when the slide-out 20 is in a retracted position and the slide-out locks 30 are in the locked position, the main cabin wall periphery 14 is pinched between the slide-out locks 30 and the extensible portion front end 24. A seal is provided around the wall opening 12 and the slide-out 20. Any suitable material including rubber can be used. The seal should be dimensioned such that seal encloses the wall opening 12 surrounding the slide-out 20.

By positioning the slide-out locks 30 vertically near the top of slide-out side walls 22, when the slide-out 20 is in the retracted position, and when slide-out locks 30 are in the locked position, the top portion of slide-out front wall 24 tightly seals the top of wall opening 12.

Having described the invention in detail and by reference to preferred embodiments thereof, it will be apparent that modifications and variations are possible without departing from the scope of the invention defined in the appended claims.

What is claim is:

1. A vehicle comprising:
   a main cabin wall comprising a wall opening extending therethrough and a wall opening periphery;
   a slide-out cabin comprising an extensible portion laterally movable through said wall opening from a retracted position substantially interior to said wall opening, to an extended position substantially exterior to said wall opening; and
   a slide-out lock arranged to secure said extensible cabin portion in said retracted position, said slide-out lock comprising a lock door pivotally rotatable from an unlocked position dissociated with said wall opening periphery to a locked position engaged with said wall opening periphery.

2. A vehicle according to claim 1, wherein said slide-out lock further comprises:
   a motor;
   a drive shaft comprising a first end and a second end, said drive shaft first end connected to said motor;
   a drive catch engaged with said drive shaft;
   an arm linkage comprising a first end and a second end, said arm linkage first end coupled to said lock door and said arm linkage second end connected to said drive catch; and
   a lock door housing comprising a frame and a door axis, said door axis traversing said frame and adjacent a frame edge, said frame surrounding said lock door, and said lock door connected to said lock door housing so as to be pivotally rotatable about said door axis.

3. A vehicle according to claim 2 wherein said slide-out lock further comprises a limit switch arranged to be engaged by said drive catch.

4. A vehicle according to claim 2 wherein said drive shaft comprises a screw drive.

5. A vehicle according to claim 1 further comprising a plurality of slide-out locks.

6. A vehicle according to claim 5 further comprising a controller programmed to prevent said slide-out locks from transitioning to said locked position unless all slide-out locks are in said unlocked position.

7. A vehicle according to claim 1 wherein said extensible portion further comprises an extensible portion front end positioned external to said wall opening, said extensible portion front end further comprising a front end periphery such that dimensions of said front end periphery exceed dimensions of said wall opening.

8. A vehicle according to claim 1 wherein said wall opening through which said extensible slide-out cabin portion is movable is provided with a wall opening seal.

9. A vehicle according to claim 1 wherein:
   said extensible portion further comprises a first extensible portion side wall and a second extensible portion side wall;
   said slide-out lock further comprises a first slide-out lock positioned along a surface of said first extensible portion side wall and a second slide-out lock positioned along a surface of said second extensible portion side wall; and
   said first and second slide-out locks are arranged such that when said first and second slide-out locks are in said locked position and said extensible portion is in said retracted position, said lock doors of said first and second slide-out locks engage said wall opening periphery.

10. A vehicle according to claim 1 wherein:
    said wall opening periphery further comprises an external wall opening periphery and an internal wall opening periphery;
    said extensible portion further comprising an extensible portion front end positioned external to said wall opening and arranged such that when said extensible portion is in said retracted position, said extensible portion front end contacts said external wall periphery.

11. A vehicle according to claim 9 wherein said first slide-out lock is positioned vertically near a top portion of said first extensible side wall, and said second slide-out lock is positioned vertically near a top portion of said second extensible side wall.

12. A vehicle according to claim 9 wherein a wall opening seal is provided such that said wall opening is completely sealed when said extensible portion is in said retracted position and said first and second slide-out locks are in said locked position.

13. A vehicle comprising:
    a main cabin wall comprising a wall opening extending therethrough and a wall opening periphery;
    a slide-out cabin comprising an extensible portion laterally movable through said wall opening from a retracted position substantially interior to said wall opening, to an extended position substantially exterior to said wall opening;
    said extensible portion comprising a first extensible portion side wall; and
    a slide-out locking mechanism comprising a first slide-out lock arranged to secure said extensible cabin portion in said retracted position, said first slide-out lock comprising a lock door pivotally rotatable from an unlocked position proximate said first extensible portion side wall, to a locked position substantially displaced from said first extensible portion side wall.

14. A vehicle according to claim 13 wherein:
    said extensible portion further comprises a second extensible portion side wall; and
    said locking mechanism further comprises a second slide-out lock arranged to secure said extensible cabin portion in said retracted position, said second slide-out lock comprising a second slide-out lock door pivotally rotatable from an unlocked position substantially proximate said second extensible portion side wall, to a locked position substantially displaced from said second extensible portion side wall.

15. A vehicle according to claim 14 wherein:

said first slide-out lock is positioned along a surface of said first extensible portion side wall such than when said extensible portion is in said retracted position and said first slide-out lock is in said locked position, said lock door of said first slide-out lock engages said wall opening periphery; and said second slide-out lock is positioned along a surface of said second extensible portion side wall such than when said extensible portion is in said retracted position and said second slide-out lock is in said locked position, said lock door of said second slide-out lock engages said wall opening periphery.

16. A vehicle according to claim 15 wherein said first slide-out lock is positioned vertically near a top portion of said first extensible side wall, and said second slide-out lock is positioned vertically near a top portion of said second extensible side wall.

17. A vehicle according to claim 14 further comprising a controller programmed to prevent said slide-out locks from transitioning to said locked position unless all slide-out locks are in said unlocked position.

18. A vehicle according to claim 13 wherein:

said main cabin wall further comprises an external wall opening periphery; and said extensible portion further comprises an extensible portion front end positioned external to said wall opening and arranged such that when said extensible portion is in said retracted position, said extensible portion front end contacts said external wall periphery.

19. A vehicle according to claim 13 wherein a wall opening seal is provided such that said wall opening is completely sealed when said extensible portion is in said retracted position and said slide-out locking mechanism is in said locked position.

20. A vehicle according to claim 13, wherein said slide-out lock further comprises:

a motor;

a drive shaft comprising a first end and a second end, said drive shaft first end connected to said motor;

a drive catch engaged with said drive shaft;

an arm linkage comprising a first end and a second end, said arm linkage first end coupled to said lock door and said arm linkage second end connected to said drive catch;

a lock door housing comprising a frame and a door axis, said door axis traversing said frame and adjacent a frame edge, said frame surrounding said lock door, and said lock door connected to said lock door housing so as to be pivotably rotatable about said door axis; and a limit switch arranged to be engaged by said drive catch.

21. A vehicle comprising:

a main cabin wall comprising a wall opening extending therethrough and a wall opening periphery;

a slide-out cabin comprising an extensible portion laterally movable through said wall opening from a retracted position substantially interior to said wall opening, to an extended position substantially exterior to said wall opening;

said extensible portion further comprising:

an extensible portion front end positioned external to said wall opening, said extensible portion front end further comprising a front end periphery such that dimensions of said front end periphery exceed dimensions of said wall opening;

a first extensible portion side wall;

a second extensible portion side wall;

a slide-out lock arranged to secure said extensible cabin portion in said retracted position, said slide-out lock comprising:

a lock door pivotally rotatable from an unlocked position dissociated with said wall opening periphery to a locked position engaged with said wall opening periphery;

a motor;

a drive shaft comprising a first end and a second end, said drive shaft first end connected to said motor;

a drive catch engaged with said drive shaft;

an arm linkage comprising a first end and a second end, said arm linkage first end coupled to said lock door and said arm linkage second end connected to said drive catch;

a lock door housing comprising a frame and a door axis, said door axis traversing said frame and adjacent a frame edge, said frame surrounding said lock door, and said lock door connected to said lock door housing so as to be pivotably rotatable about said door axis;

a limit switch arranged to be engaged by said drive catch; and a slide-out lock mechanism wherein said slide-out lock mechanism further comprises:

a first slide-out lock positioned along a surface of said first extensible portion side wall;

a second slide-out lock positioned along a surface of said second extensible portion side wall; and a controller programmed to prevent said slide-out locks from transitioning to said locked position unless all slide-out locks are in said unlocked position.

22. A vehicle comprising:

a main cabin wall comprising a wall opening extending therethrough and a wall opening periphery;

a slide-out cabin comprising an extensible portion laterally movable through said wall opening from a retracted position substantially interior to said wall opening, to an extended position substantially exterior to said wall opening; and a slide-out lock arranged to secure said extensible cabin portion in said retracted position, said slide-out lock comprising a lock door adjustable from a locked position interfering with lateral movement of said extensible portion to an unlocked position unbiased with respect to lateral movement of said extensible portion.

* * * * *